Patented May 30, 1950

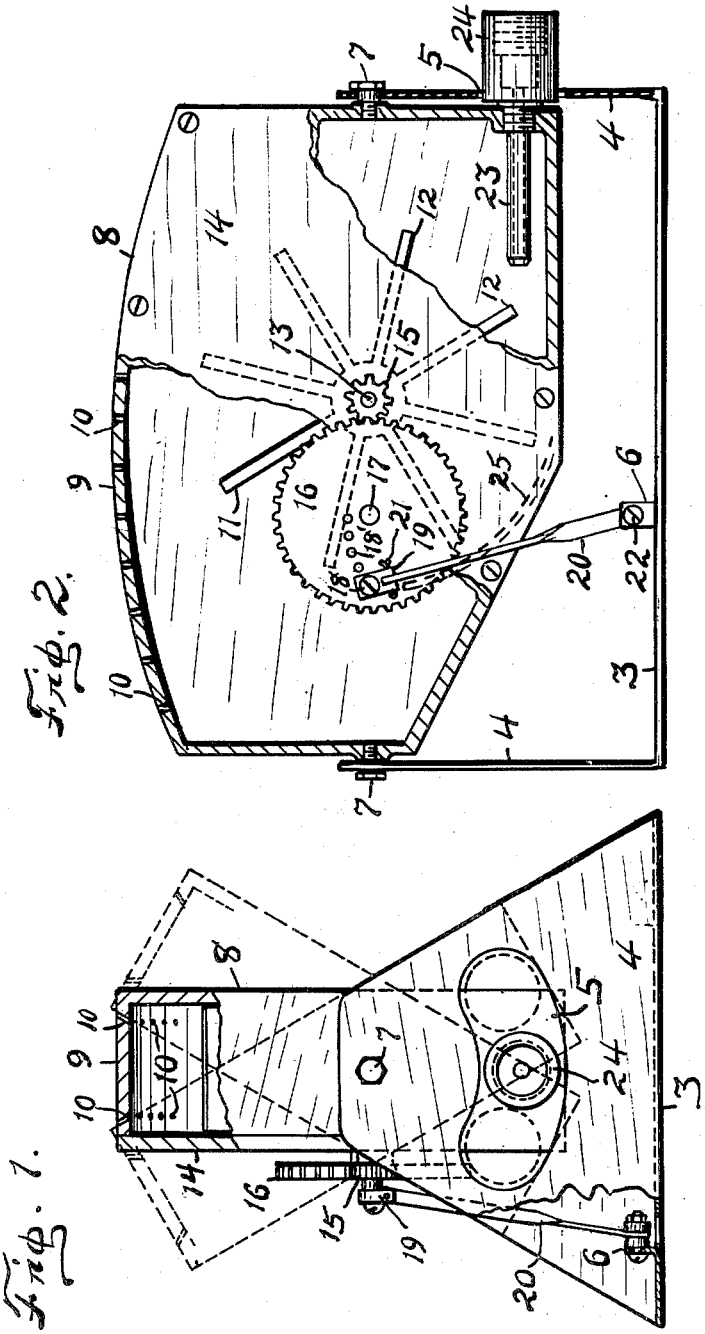
May 30, 1950     E. H. DAMMEYER     2,509,762
LAWN SPRINKLER
Filed April 18, 1946
INVENTOR.
Edwin H. Dammeyer
BY
Attorney.

2,509,762

UNITED STATES PATENT OFFICE 2,509,762

LAWN SPRINKLER

Edwin H. Dammeyer, Fort Wayne, Ind.

Application April 18, 1946, Serial No. 663,163

3 Claims. (Cl. 299—67)

This invention relates to improvements in lawn sprinklers of the type wherein water supplied through a hose is sprayed into the atmosphere and directed in various directions progressively to effect distribution of the sprayed water uniformly over a definite area.

An object of the invention is to provide an appliance by which to disseminate water supplied through a hose over a selected area of lawn without over-reaching the borders thereof.

Another object of the invention is to provide a sprinkling appliance by which to spray water in various directions over a definitely limited area of a lawn as selected by the operator.

And a further object of the invention is to provide automatically operated mechanism by which the spray emitted from the appliance is diverted in various directions.

Other objects and advantages of the invention appear in the following description.

An illustrative embodiment of the invention is shown in the accompanying drawings, in which—

Fig. 1 is an end elevational view of an appliance in which the invention is incorporated, portions thereof being broken away; and Fig. 2 is a side elevational view of the structure shown in Fig. 1, portions thereof being broken away.

The illustrative embodiment of the invention consists of a supporting base 3 formed of a plate having upturned ends 4, one of which has an arcuate opening 5 made therein and an upturned bracket 6. Between the upturned ends of the base is pivotally mounted, on trunnions 7, a hollow sprinkler head 8, the upper wall 9 of which is arcuate and has made therein two parallel series of discharge openings 10 that extend through the wall, those in one series being laterally divergent respecting those in the other series of openings, so that water discharged from the head is directed through the two series of openings in relative opposite directions.

Within the head is mounted a propeller 11 having numerous blades 12 mounted upon a shaft 13 for rotation therewith. One end of the shaft 13 projects through one side wall 14 of the head and has secured thereon, exterior of the head, a pinion 15. A gear 16 is mounted exteriorly of the head upon a stub shaft 17 that projects from the wall 14 of the head, with its axis extending parallel with that of the drive shaft 13. The gear has operating engagement with the pinion 15, so that upon rotation of the propeller the gear is accordingly revolved.

The gear 16 has a wrist or crank-pin 18 upon which is mounted a shackle 19 that is coupled with the bracket 6 on the base 3 by means of a connecting bar 20, the ends of which are attached respectively to the shackle 19 and bracket by means of pins 21 and 22. A series of holes 18' are made in the gear 16, located at various distances from the stub shaft, in which to secure the crank-pin selectively, thus to vary the throw of crank-pin and swing of the head.

In one end of the head 8 is secured a nozzle 23 that projects therein directed in a line extending at right angles to the axis of the propeller and in a plane intersecting the propeller blades, the arrangement being such that, when water is discharged from the nozzle into the head the force thereof against the blades, imparts movement to the propeller causing rotation of the propeller shaft, pinion, and the gear. Movement of the crank-pin is confined by the connecting bar 20 and the shackle 19, whereupon rotation of the gear causes oscillation of the head 8 continuously during operation of the appliance.

The nozzle is provided exteriorly with a hose coupling 24 that projects loosely through the opening 5 in the adjacent end 4 of the supporting base so as to have free movement therein as the head is oscillated.

Within the head is disposed a deflector 25 suitably arranged to cause water after passing the propeller to become distributed more or less uniformly within the head before expulsion thereof through the discharge openings.

In use, the appliance is placed upon the lawn in a selected locality and a hose (not shown) is attached to the coupling 24. Water is then supplied through the hose to the head which flows through the nozzle against the blades of the propeller causing rotation thereof and movement of the pinion and gear and consequent rocking movement of the head upon its trunnions concurrently. The water flowing through the head and out through the discharge openings is broadcast over a rectangular area, limited by the angularity of the discharge of the spray.

Variations from the particular construction above disclosed may be resorted to by the exercise of skill in the art, without departure from the spirit or scope of the invention.

What I claim is:

1. A sprinkler apparatus consisting of a base, a hollow sprinkler head pivotally supported by said base for oscillating movement and having several series of divergent discharge openings in its top, a propeller within said head provided with a shaft supported therein, one end of said shaft having secured thereon a pinion, a gear mounted exteriorly of the head upon a stub shaft on said head, engaged by said pinion and provided with a crank-pin, there being a series of holes in the gear in which said crank-pin is selectively secured, a shackle on said crank-pin, a bar pivotally secured at its ends respectively with said shackle and said base, the arrangement being such as to cause oscillating movement of the sprinkler head upon rotation of the propeller, a nozzle secured in one end of the head with its discharge end disposed in line with the blades of the propeller and its opposite end having a hose coupling exterior of the head, and a deflector within the head located adjacent the propeller opposite the nozzle.

2. A lawn sprinkler consisting of a hollow head pivotally supported upon a base and having divergent discharge openings in its top, a bladed propeller mounted for rotation within said head having a drive shaft one end of which extends through the adjacent wall of the head, and provided with a pinion secured thereon, a stub shaft on the head extending parallel with said drive shaft and having thereon a gear meshing with said pinion, said gear having a crank-pin provided with a shackle, a bar pivotally connected at its end respectively with said shackle and said base, whereby oscillating movement is imparted to said head upon rotation of the gear, and a nozzle secured to and extending into said head in line with the peripheral portion of the propeller, said nozzle having a hose coupling exterior of said head.

3. In a lawn sprinkler, a base, a sprinkler head, mounted on said base for oscillatory movement, having numerous sprinkler openings in its top and provided with an exterior stub-shaft, a bladed propeller disposed within the sprinkler head provided with a propeller shaft supported by said head, one end of said shaft extending through one wall of the head parallel with and spaced from said stub-shaft, a gear mounted on said stub-shaft provided with a wrist-pin, a pinion on said propeller shaft meshing with said gear, a link pivotally connected at one end to said base, the opposite end of the link having a shackle connected on said wrist-pin, and a nozzle secured to and extending into said head arranged to direct water supplied to the head therethrough to activate the propeller.

EDWIN H. DAMMEYER.

REFERENCES CITED

The following references are of record in the file of this patent:

UNITED STATES PATENTS

| Number | Name | Date |
|---|---|---|
| 1,079,574 | Nicholson | Nov. 25, 1913 |
| 1,454,844 | Campbell | May 15, 1923 |
| 1,751,641 | Lindhorst | Mar. 25, 1930 |

FOREIGN PATENTS

| Number | Country | Date |
|---|---|---|
| 578,352 | Germany | June 13, 1933 |